Patented Jan. 21, 1941

2,229,127

UNITED STATES PATENT OFFICE 2,229,127

SULPHANILAMIDE REACTION PRODUCT AND PROCESS OF MAKING IT

George W. Raiziss, Le Roy W. Clemence, and Abraham I. Kremens, Philadelphia, Pa., assignors to Abbott Laboratories, North Chicago, Ill., a corporation of Illinois No Drawing. Application January 31, 1938, Serial No. 187,896

4 Claims. (Cl. 260—501)

The present invention relates to a novel sulphanilamide—alkali formaldehyde sulphoxylate combination product and the method of preparing the same.

The use of sulphanilamide which is chemically known as para-amino-benzene-sulphonamide in combating certain infections and particularly streptoccocic infections is well known. However, although it has been recognized as an extremely valuable drug, the low solubility of para-amino-benzene-sulphonamide has limited its use in most instances to tablet form for oral administration. In fact, as the product dissolves to the extent of only 0.8 percent in aqueous medium, i. e. 0.8 gram per 100 cc. of water, its use either subcutaneously or intravenously has practically been prohibited in view of the large volume of liquid necessary for the injection. In addition, the oral administration of sulphanilamide in tablet and capsule form has been restricted in view of its relative insolubility. This low solubility of the drug presented an acute problem for in cases of grave illness it is always desired to get the drug in proper concentration into the blood stream as quickly as possible. The medical profession has desired a soluble derivative of para-amino-benzene-sulphonamide having the high therapeutic effect and low toxicity of the parent compound. Many attempts have been made in the past to prepare solutions of a sulphanilamide product that would be adaptable for parenteral injection as well as a product of high solubility that would be rapidly absorbed when administered orally. However, the solutions and products produced by prior methods while admittedly a great advance in the art, have nevertheless been found upon exhaustive investigation to possess certain undesirable properties. For example, some of the heretofore suggested methods produce solutions of sulphanilamide combination products which are susceptible to rapid oxidation with a tendency to crystallize or precipitate immediately upon exposure to air. Some of the solutions also have a tendency to crystallize in the sealed ampules when the reaction solutions cool to room temperature. In addition, and of great importance, we have found that the prior reaction solutions containing sulphanilamide combination products are not particularly adaptable for preparing products of high solubility in solid form.

The principal object of our invention is to provide a stable combination or reaction product of sulphanilamide and alkali formaldehyde sulphoxylate free from the above noted disadvantages.

It is also an object of our invention to provide a process for preparing a solid combination product of sulphanilamide which is capable of forming solutions adaptable for parenteral injection.

It is a further object of our invention to provide a process for preparing a solid combination product of sulphanilamide particularly adaptable for oral administration.

Other objects will be apparent as the description proceeds hereinafter.

We have discovered that a novel reaction product of sulphanilamide and alkali formaldehyde sulphoxylate of great stability may be prepared by reacting the ingredients in a dehydrating medium or solvent which is miscible with water such as ethyl alcohol. Although our invention is not to be limited by theoretical explanations, our investigations indicate that the dehydrating alcoholic medium acts as a catalyst by aiding in the formation of the novel reaction product. We do not known the exact chemical structure of our new reaction product but our investigations indicate the product to be a complex salt or addition product having the probable formula of

$NH_2SO_2.C_6H_4.NH_2.HO.CH_2SO_2Na$

The following example will serve to illustrate our invention:

About 8.6 grams of sulphanilamide and about 7.7 grams of sodium formaldehyde sulphoxylate representing a molecular proportion of each, are added to 100 cc. of 95 percent ethyl alcohol (denatured 3A-alcohol 100 gal.—ethyl, 5 gal. pure methyl). The mixture is brought to boiling on a water bath, the flask having been provided with a reflux condenser. The solid materials go into solution after a few minutes and the reaction product starts to precipitate after approximately one-half to one hour of heating. After about 3½ hours of boiling the hot mixture is quickly filtered on a suction funnel, and the resulting compound or precipitate washed several times with considerable quantities of ethyl alcohol. The new reaction product has a melting point of about 227° to 229° C.

The new product has a solubility of over 10 percent in water at room temperature and the solutions of the reaction product are relatively stable and free from crystallization even when left exposed to air for several hours. Our process is particularly adaptable for preparing a soluble solid product of sulphanilamide which is sufficiently stable to be put up in capsules for oral use. Investigations have shown our product to be considerably less toxic than sulphanilamide itself.

It will be understood that in place of the ethyl alcohol employed in the above example that absolute alcohol may be employed although the presence of about five percent of water in a lower alcohol reaction medium which retains its dehydrating properties has been found satisfactory for commercial operation. In fact when methyl alcohol is employed the best yields are often obtained in the presence of about five percent of water. It will be understood by those skilled in the art that references herein and in the appended claims to dehydrating mediums or solvents are intended to cover such mediums as long as they retain their dehydrating characteristics, regardless of the presence of small amounts of water.

We claim:

1. The method of forming a stable reaction product of para amino benzene sulphonamide and an alkali metal formaldehyde sulphoxylate which comprises reacting para amino benzene sulphonamide with alkali metal formaldehyde sulphoxylate at the boiling temperature of and in the presence of a dehydrating solvent selected from the lower alcohols consisting of methyl and ethyl alcohol.

2. The method of forming a stable reaction product of para amino benzene sulphonamide and a sodium formaldehyde sulphoxylate which comprises reacting para amino benzene sulphonamide with sodium formaldehyde sulphoxylate at the boiling temperature of and in the presence of a dehydrating medium consisting essentially of ethyl alcohol.

3. The method of forming a stable reaction product of para amino benzene sulphonamide and a sodium formaldehyde sulphoxylate which comprises reacting para amino benzene sulphonamide with sodium formaldehyde sulphoxylate at the boiling temperature of and in the presence of a dehydrating medium consisting essentially of methyl alcohol.

4. Pharmaceuticals selected from the group consisting of methyl and ethyl alcohol p-amino benzene sulphonamide-sodium formaldehyde sulphoxylate reaction products, said products having a melting point of about 227° to 229° C., being soluble in water and the aqueous solutions of said reaction products being substantially free from crystallization.

GEORGE W. RAIZISS.
LE ROY W. CLEMENCE.
ABRAHAM I. KREMENS.